United States Patent
Wieder et al.

[11] Patent Number: 5,864,285
[45] Date of Patent: Jan. 26, 1999

[54] METHOD AND APPARATUS FOR CONTROLLING THE APPROACH OF A VEHICLE TO AN OBSTACLE

[75] Inventors: Gerhard Wieder, Besigheim; Udo Ziegler, Remseck; Franz Hanschek, Markgröningen, all of Germany

[73] Assignee: Robert Bosch GmbH, Stuttgart, Germany

[21] Appl. No.: 791,582

[22] Filed: Jan. 31, 1997

[30] Foreign Application Priority Data

Mar. 1, 1996 [DE] Germany ............... 196 07 788.5

[51] Int. Cl.[6] .................................................. B60Q 1/00
[52] U.S. Cl. .................... 340/435; 340/436; 340/903; 701/70; 701/301; 342/71; 367/909
[58] Field of Search ................... 340/435, 436, 340/901, 903; 364/426.01, 461; 342/70, 71, 72; 367/909; 180/169; 701/70, 301

[56] References Cited

U.S. PATENT DOCUMENTS

| | | | |
|---|---|---|---|
| 3,898,652 | 8/1975 | Rashid | 342/59 |
| 4,825,211 | 4/1989 | Park | 340/435 |
| 4,864,298 | 9/1989 | Dombrowski | 340/435 |
| 4,934,477 | 6/1990 | Dai | 340/435 |
| 5,101,927 | 4/1992 | Murtuza | 180/275 |
| 5,173,859 | 12/1992 | Deering | 364/426.01 |
| 5,177,462 | 1/1993 | Kajiwara | 340/435 |
| 5,251,680 | 10/1993 | Minezawa et al. | 180/169 |
| 5,315,295 | 5/1994 | Fujii | 340/435 |
| 5,574,644 | 11/1996 | Butsuen et al. | 340/903 |
| 5,635,922 | 6/1997 | Cho et al. | 340/435 |
| 5,646,612 | 7/1997 | Byon | 340/903 |

FOREIGN PATENT DOCUMENTS

| | | |
|---|---|---|
| 0484995 | 10/1991 | European Pat. Off. . |
| 3121684 | 12/1982 | Germany . |
| 3503352 | 10/1986 | Germany . |
| 9614591 | 5/1996 | WIPO . |

Primary Examiner—Edward Lefkowitz
Attorney, Agent, or Firm—Fulbright & Jaworski, LLP.

[57] ABSTRACT

In a first distance range to the obstacle, the velocity of the vehicle is limited by the control of the power of the drive unit of the vehicle. In a second distance range which is less than said first distance range, the braking force at the wheel brakes is built up.

7 Claims, 3 Drawing Sheets

5,864,285

METHOD AND APPARATUS FOR CONTROLLING THE APPROACH OF A VEHICLE TO AN OBSTACLE

BACKGROUND OF THE INVENTION

The invention pertains to a method and to an apparatus for controlling the approach of a vehicle to an obstacle.

When a vehicle approaches an obstacle, especially during the attempt to park, unwanted driving situations can occur as a result of, for example, the limited view of the driver. Especially in the case of commercial vehicles, the driver cannot see the area behind the vehicle when in reverse. It is possible for the driver to estimate incorrectly the distance to the obstacle (especially the distance between the vehicle and a loading ramp), and it is also possible for the vehicle to be damaged and even for personal injury to occur if the driver fails to notice a person located behind the vehicle.

For this reason, parking aids have been developed, which use distance sensors (based on ultrasound or lasers) to measure the distance between the vehicle and the closest obstacle. This information is then presented to the driver optically and/or acoustically (see, for example, DE 35 03 352 A1). A further improvement of these solutions is found in DE 31 21 684 A1. This document describes a vehicle with several distance sensors, so that, as the vehicle is approaching an obstacle, the vehicle's environment, that is, the distance to the obstacle, can be displayed continuously to the driver and automatic actions taken on the drive or brake control units. The intended result is to influence the motion of the vehicle sufficiently in advance in such a way as to prevent contact with an obstacle.

The object of the invention is to control a vehicle's approach to an obstacle by intervention in the engine control and/or brake control.

SUMMARY OF THE INVENTION

According to the invention, the driver is effectively relieved of the burden of approaching an obstacle, and the approach itself is safely managed. Incorrect estimates of the distance to the obstacle, which can lead to damage to the vehicle, for example, are avoided.

It is especially advantageous that, in conjunction with a distance sensor, interventions are made in the power of the vehicle's engine and in the brake system. As a result, the driver can safely drive up to the obstacle at minimum speed even in blind situations.

The use of the solution according to the invention is especially advantageous when used only in reverse.

According to the invention, within a first distance range between the vehicle and the obstacle, only the power of the engine is influenced in such a way as to limit the velocity of the vehicle. In a second distance range to the obstacle, intervention is made in the brakes, by means of which the vehicle is able to approach the obstacle at minimal speed. It is advantageous here that the driver does not have to adjust the engine power or the brake in finely calibrated fashion; on the contrary, he is able to concentrate on the actual driving situation at hand.

An advantageous addition consists in an approach switch, with the help of which the driver can approach the obstacle at minimal speed in the second distance range.

The intervention in the braking of the vehicle is carried out by means of an electrically controlled brake system, but it can also be carried out in conjunction with a brake system with drive slip control, in which the brake pressure can be built up and released at least at one drive axle.

It is especially advantageous for the brake control and the engine control to be able to communicate with each other via a bus system (e.g., CAN).

Further advantages can be derived from the following description of exemplary embodiments.

DESCRIPTION OF EXEMPLARY EMBODIMENTS

Figure 1:
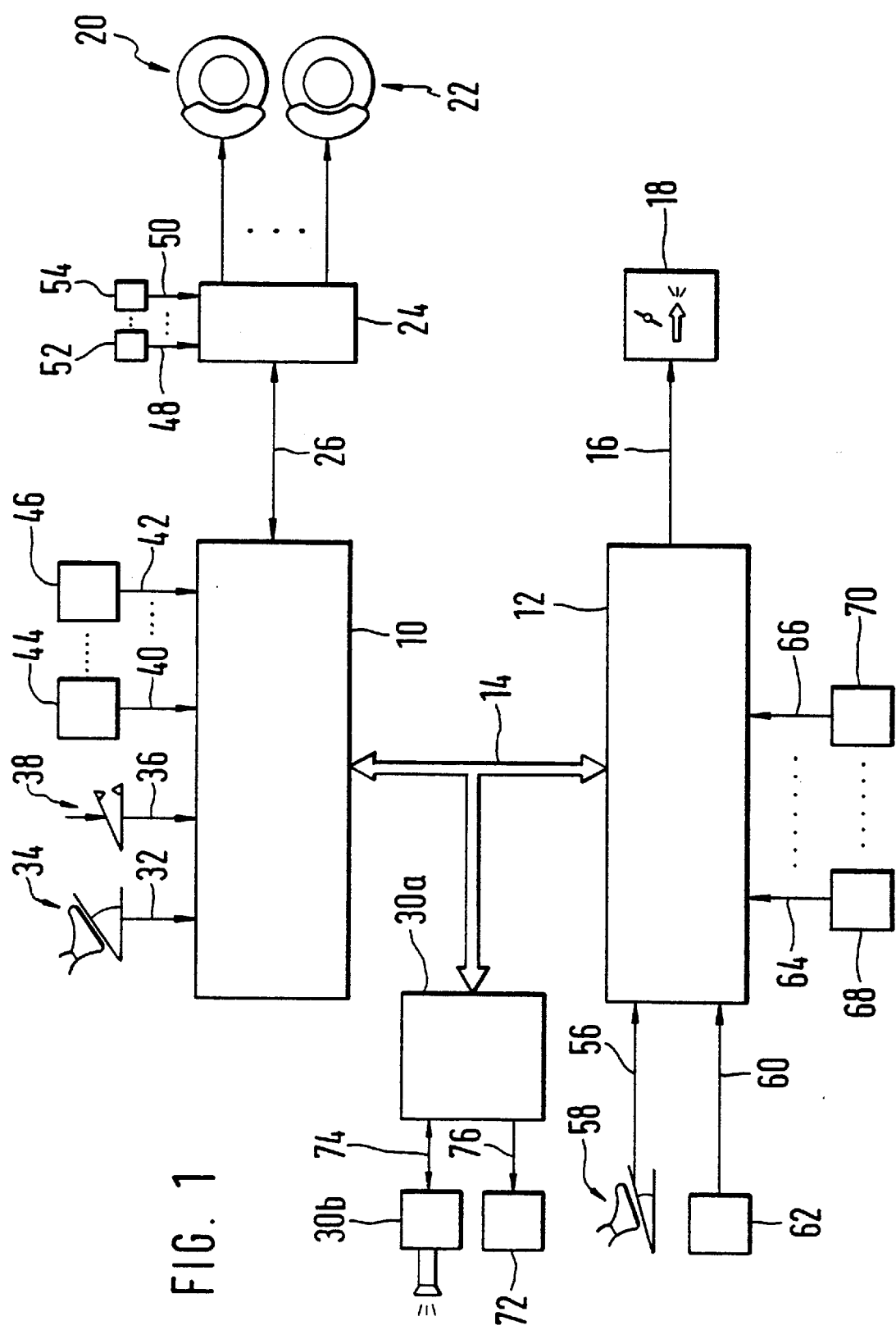
FIG. 1 shows a functional block diagram of a control system for a vehicle.

FIG. 1 shows a control system for a motor vehicle, which intervenes at least in the engine power and the brake system of the vehicle. A system such as this comprises at least two control unit 10, 12, which serve to control the brake system and the power of the vehicle's engine. These control units are linked by way of a communications system 14 (e.g., CAN) for the exchange of information and data. Control unit 12 controls the power of the drive unit of the vehicle over at least one output line 16 by driving appropriate actuators 18 for the feed of air or fuel and/or for adjusting the ignition angle. In a corresponding manner, the individual wheel brakes 20–22 of the vehicle are actuated by one or more control units 24, which are connected by a communications system 26 to control unit 10. Communications system 26 in the preferred exemplary embodiment is the same as communications system 14. Control units 24 produce the nominal value determined by control unit 10 in wheel brakes 20–22 by appropriate actuation of valves (in the case of hydraulic or pneumatic brake systems) or by appropriate actuation of final control elements (in the case of electromechanical brake systems). Control unit 10 can be either a control unit for electrical control of the brake system or a control device for implementing antilock and antislip control. Correspondingly, control unit 12 can be an electronic engine control for spark-ignition or diesel engines or electric motors. Operating variables of the drive unit, of the brake system, and/or of the vehicle, furthermore, are transmitted over input lines to control units 10, 12.

In the preferred exemplary embodiment, control unit 10 is connected by way of communications system 14 to a control unit 30a for measuring distances, by way of an input line 32 to a measuring device for detecting the actuation of brake pedal 34, by way of an input line 36 to an approach switch 38, by way of input lines 40–42 to measuring devices 44–46 for detecting additional operating variables of the vehicle or of the brake system such as the velocity of the vehicle, the axle loads, etc., Control unit 24 for controlling wheel brakes 20–22 is connected by way of input lines 48–50 to measuring devices 52–54 for detecting wheel-specific operating variables such as, for example, the speeds of the wheels, the brake pressures produced at the individual wheels, etc.

Control unit 12 for controlling the drive power of the engine is connected by way of an input line 56 to a measuring device 58 for detecting the position of a gas pedal, by way of an input line 60 to a measuring device 62 for detecting the selected gear, and by way of additional input lines 64–66 to measuring devices 68–70 for detecting additional operating variables of the drive unit and/or of the vehicle such as the engine rpm's, the engine temperature, etc., which are evaluated to control the drive power. By way of communications system 14, 26, it is possible for control units 10, 12, 24 to exchange with each other the detected data or the calculation results derived from the data.

In the preferred exemplary embodiment, control unit 30a is a so-called "reverse warner", which is connected by a line 74 to an ultrasonic measuring device 30b for measuring the distance to obstacles. It is also connected by a line 76 to a display device 72, which tells the driver acoustically or optically how far away he is from the obstacle as he is approaching it.

In other advantageous exemplary embodiments, measuring device 30b is a distance measuring device which is based on some other measurement principle (laser beam, radar, etc.). To evaluate the distance signal and to form the actuating variables, control unit 30a is equipped with a microcomputer.

In the case of an electrically controlled brake system, control unit 10 controls the brake system of the vehicle as a function of the driver's braking command. In the case of an ABS/ASR system, control unit 10 goes into action [only—Tr.] in the appropriate operating situations. In a corresponding manner, control unit 12 controls the power of the drive unit as a function of the driver's command, derived from the actuation of the gas pedal. When the vehicle approaches an obstacle, especially when driving in reverse, control units 10 and 12 control the brake system and the drive power as a function of the calculated distance from the obstacle. This is detected by measuring device 30b and control unit 30a. In a first distance range, such as at distances of less than a meter, the power of the drive unit is reduced by way of control unit 12 so that the vehicle does not exceed a predetermined speed (e.g., 3 km/h). When the distance falls below a second limit value, e.g., 0.5 m, control unit 10 also builds up the braking force at the wheel brakes. In an advantageous exemplary embodiment, the driver can, by actuating an approach switch, reduce the distance even further at minimum speed. In parallel with this, the driver is kept informed of the distance by an optical and/or acoustic display. In a preferred exemplary embodiment, the pressure is built up to the point that the vehicle stops. Of course, if the vehicle has a manual transmission, the driver must disengage the clutch to prevent the engine from stalling. The brake pressure which had been produced is released again when the approach switch is actuated.

Figure 2:
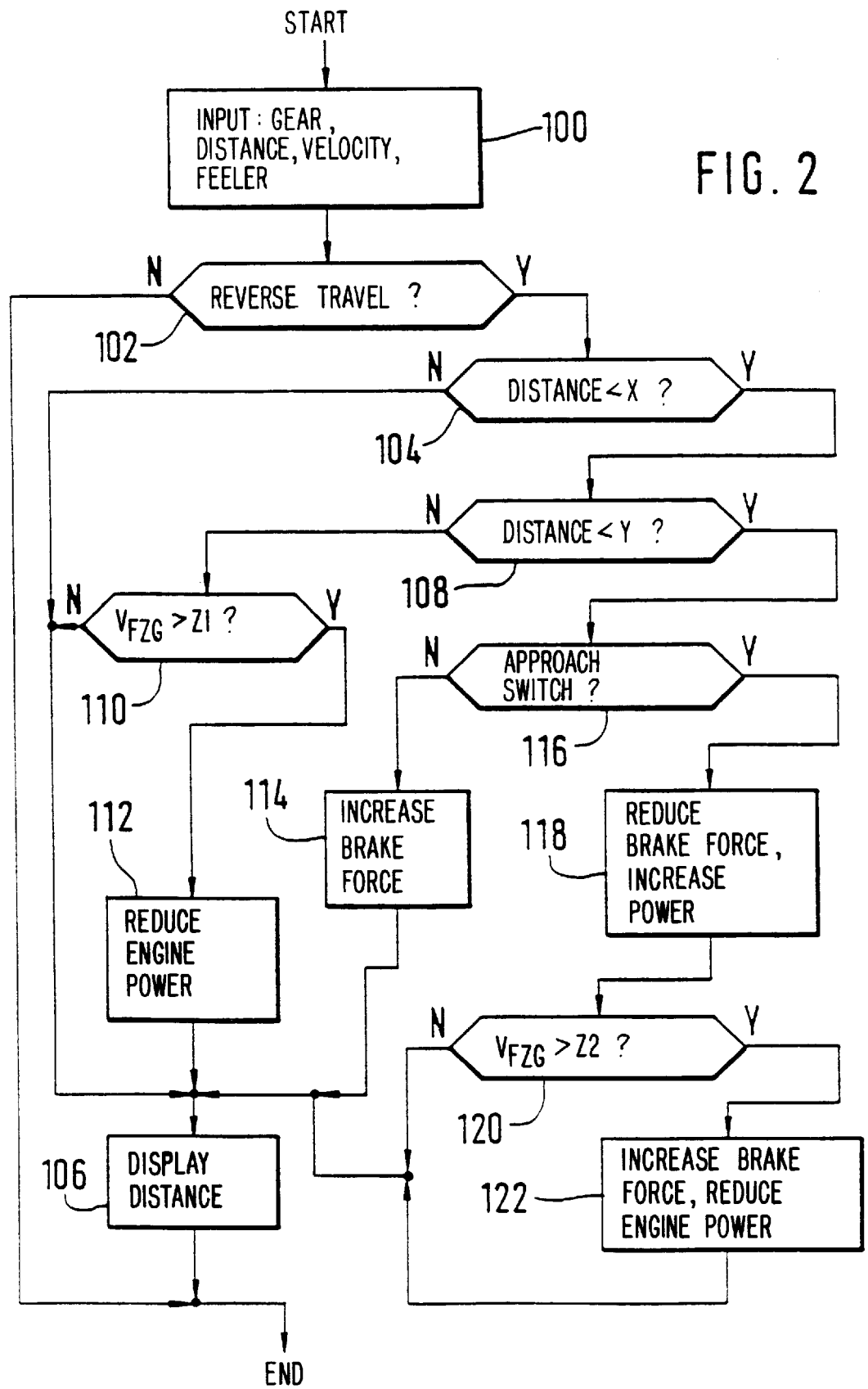
FIG. 2 is a flow diagram which can be implemented by the system of FIG. 1.
Figure 3A:
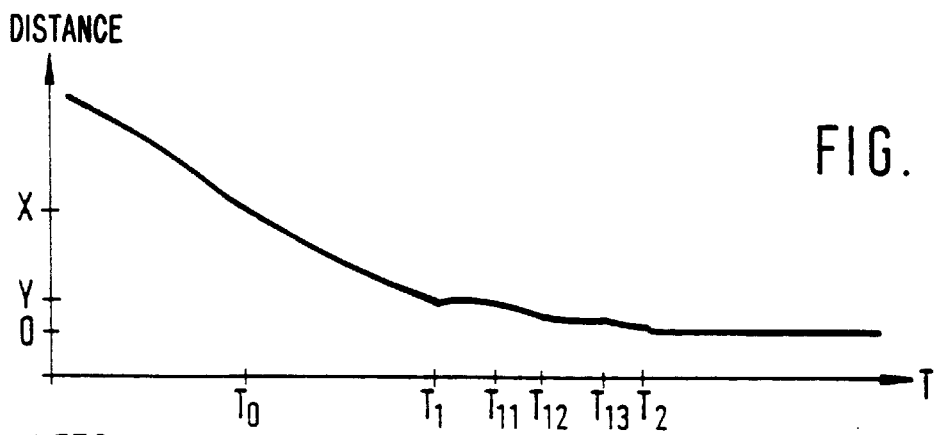
FIGS. 3a–3e are exemplary time plots of obstacle distance, vehicle velocity, engine power, brake pressure, and approach switch actuation.
Figure 3B:
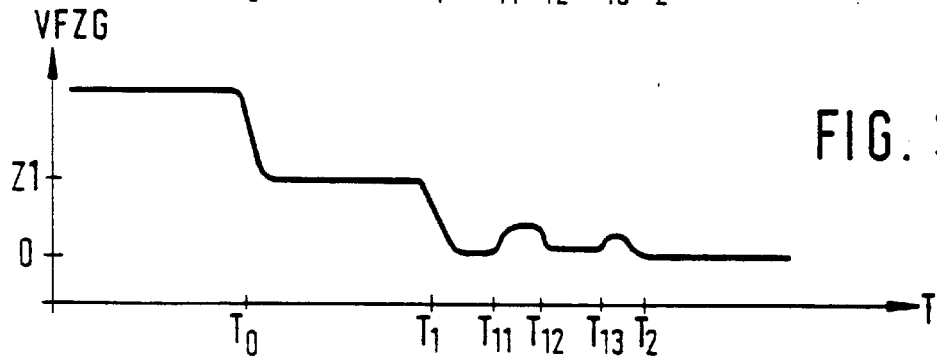
Figure 3C:
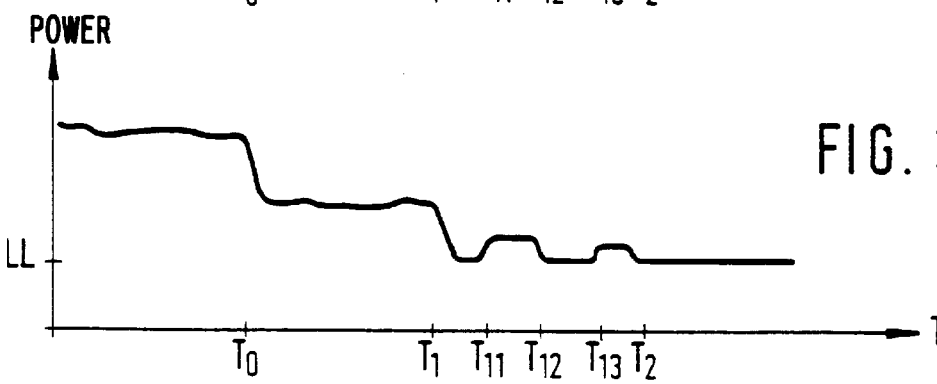
Figure 3D:
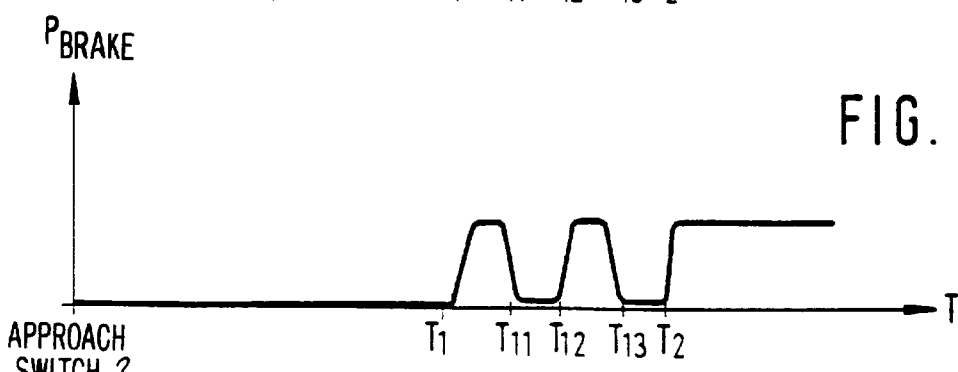
Figure 3E:
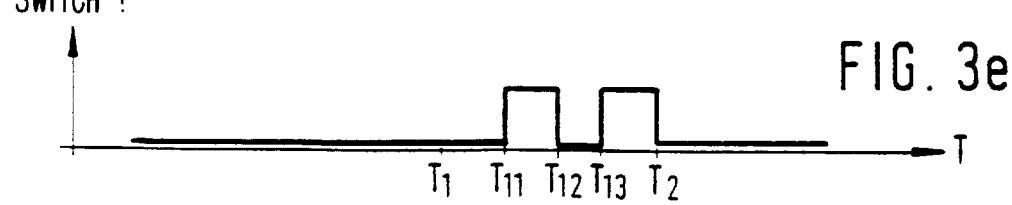

A preferred exemplary embodiment of the control according to the invention is illustrated in FIG. 2 on the basis of a flow chart. This flow chart represents a program which runs on a microcomputer, such as on a microcomputer in control unit 30a. Control unit 30a, in an advantageous exemplary embodiment, is integrated into control unit 10 or 12; the program illustrated can then run in one of the microcomputers of these control units.

The subprogram shown in FIG. 2 is initiated at predetermined time intervals (such as ever 10–100 msec). In the first step 100, the necessary operating variables, e.g., the selected gear, the distance, the velocity of the vehicle, and the position of the approach switch switch accepted as input. Then, in question step 102, the program checks on the basis of the signal for the selected gear whether or not the vehicle is traveling in reverse. If it is not, the subprogram terminates and repeats at the next time interval. If the transmission is in reverse gear, however, the subprogram asks in question step 104 whether or not the distance is less than a first predetermined limit value X, such as 1 m. If this is not the case, in step 106 the determined distance is displayed optically and/or acoustically to the driver, and the subprogram terminates. If the distance is less than the predetermined first value X, then in the following question step 108 the subprogram checks to see whether or not it is less than a second predetermined value Y. This value is, for example, 0.2–0.5 m. If this is not the case, that is, if the vehicle is in a distance range between values X and Y, the program checks in step 110 to see whether the velocity of the vehicle is greater than a predetermined value $Z_1$. In a preferred exemplary embodiment, this value is 3 km/h. If the velocity of the vehicle does not exceed this value, the program continues with step 106, and the engine power is adjusted in accordance with the driver's command. If the velocity of the vehicle exceeds the limit value $Z_1$, then in step 112 the power of the engine is reduced so as to obey the velocity limit value independently of the driver's command, and then the program continues with step 106. If it is found in step 108 that the distance is less than the value Y, then in step 114 braking force is built up in the wheel brakes.

There are two possible ways in which this operational phase can be realized. The first way consists in building up enough braking force to bring the vehicle to a halt. The driver can then, by actuating the clutch pedal in the case of the manual transmission and possibly by actuating the approach switch or the gas pedal, bring the vehicle in this operating mode up to the obstacle at minimum velocity. Upon actuation of the approach switch or the gas pedal, the braking force is released, and the engine power increased slightly, until possibly the driving speed is limited to a second limit value $Z_2$. In another advantageous embodiment, the braking force is built up just enough so that the vehicle is traveling at minimum speed. Upon actuation of the gas pedal or of the approach switch, the vehicle is brought up to the obstacle by the control of the braking force and the engine power without exceeding the predetermined minimum velocity $Z_2$ (e.g., 1 km/h).

In the exemplary embodiment shown in FIG. 2, the program checks in step 116 to see whether or not the approach switch has been actuated. If it has not, the brake pressure is built up in step 114. The vehicle is brought to a halt. If the approach switch has been actuated, the braking force which may have been built up is lowered in step 118, so that the vehicle moves toward the obstacle upon actuation of the gas pedal by means of automatic power control. In the following question step 120, the program checks to see whether or not the velocity of vehicle has exceeded predetermined limit value $Z_2$. If so, the engine power is reduced again and possibly the braking force increased in step 122 upon actuation of the approach switch or the gas pedal. After step 122, the program proceeds to step 106 in the same way as it did after step 114.

The solution according to the invention is explained in FIG. 3 on the basis of time graphs. FIG. 3a shows the change in distance over time, FIG. 3b the change in the velocity of the vehicle, FIG. 3c the change in the engine power, FIG. 3d the change in the brake pressure, and FIG. 3e the change in the approach switch switch signal. Up to time $T_0$, let it be assumed that the vehicle is traveling toward the obstacle at an engine power and vehicle velocity controlled by the driver. At time $T_0$, let the distance fall below X. It is at this point that the solution according to the invention goes into action. It must be remembered that in general the driver continues to control the engine power by actuating the clutch and the gas pedal. The solution according to the invention imposes certain limits on the influence which the driver can exert in this way. Similarly, the driver can at any time actuate the vehicle brakes to any extent desired. Once the distance has fallen below X, the power of the engine is controlled in such a way that the velocity of the vehicle cannot exceed the limit value $Z_1$, even if the driver were to specify a faster speed. At time $T_1$, the distance falls below the value Y. At this point, the braking force is built up as shown in FIG. 3d. The vehicle stops (velocity zero); the engine power (through corresponding control by the driver) corresponds essentially to the power at idle. At time $T_{11}$, the driver actuates the approach switch as shown in FIG. 3e. As a result, the braking force is released again, and (upon actuation of the gas pedal or automatically) the engine power is increased. The vehicle moves at minimum speed toward the obstacle. To maintain the minimum velocity in this operating phase, the braking force is increased or decreased as dictated by circumstances. At time $T_{12}$, the approach switch is deactivated, brake pressure is built up again, and the vehicle is brought to a halt. At time $T_{13}$, the approach switch is actuated again, brake pressure is released, and possibly the engine power increased. At time $T_2$, let it be assumed that the obstacle is reached, so that the approach switch is deactivated and the vehicle brought to halt by the buildup of braking force.

In another advantageous exemplary embodiment, just enough braking force is built up to prevent the vehicle from exceeding a limit velocity in the second operating phase until the obstacle is reached.

In yet another advantageous exemplary embodiment, the release of braking pressure is initiated not by an approach switch but rather as a function of a switch signal characterizing the release and actuation of the gas pedal.

We claim:

1. Method for controlling the approach of a vehicle to an obstacle, the vehicle moving at a velocity and having an engine which produces power and wheel brakes, said method comprising detecting the distance from the vehicle to an obstacle, determining the velocity of the vehicle when approaching the obstacle, maintaining the velocity of said vehicle below a first predetermined velocity by reducing engine power when said distance is in a first predetermined distance range, determining when the vehicle is in a second predetermined distance range which is closer to the obstacle than the first predetermined distance range, and maintaining the velocity of said vehicle below a second predetermined velocity by building up braking force when the distance is in said second predetermined distance range, until the obstacle is reached.

2. Method as in claim 1, and further comprising activating an approach switch when said distance is in said second predetermined range, and building up braking force so that said vehicle velocity is below said second predetermined velocity when said approach switch is activated.

3. Method as in claim 2 further comprising reducing engine power so that said vehicle velocity is below said predetermined velocity when said approach switch is activated.

4. Method as in claim 1, wherein said braking force is controlled by one of a group consisting of an electronic brake control and an ABS control unit.

5. Method as in claim 1 wherein said engine power is reduced by one of a group consisting of an electronic engine control and an ASR control unit.

6. Method as in claim 1, and further comprising detecting when said vehicle is travelling in reverse, said detecting of distance being performed only responsive to detection that said vehicle is traveling in reverse.

7. Apparatus for controlling the approach of a vehicle to an obstacle, the vehicle moving at a velocity and having an engine which produces power and wheel brakes, said apparatus comprising means for detecting the distance between the vehicle and the obstacle, means for determining the velocity of the vehicle when approaching the obstacle, means for maintaining the velocity of said vehicle below a first predetermined velocity when said distance is in a first predetermined distance range, said means for maintaining includes means for reducing engine power, means for determining when the vehicle is in a second predetermined distance range which is closer to the obstacle than the first predetermined distance range, means for maintaining the velocity of said vehicle below a second predetermined velocity when the distance is in said second predetermined distance range, until the obstacle is reached said means for maintaining includes means for building up braking force.

\* \* \* \* \*